(12) United States Patent
Wiley

(10) Patent No.: US 9,776,573 B2
(45) Date of Patent: Oct. 3, 2017

(54) VEHICLE STORAGE CONTAINER, AND METHODS OF USE AND MANUFACTURE THEREOF

(71) Applicant: Honda Motor Co., Ltd., Tokyo (JP)

(72) Inventor: Matthew J. Wiley, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/012,727

(22) Filed: Feb. 1, 2016

(65) Prior Publication Data

US 2017/0217375 A1    Aug. 3, 2017

(51) Int. Cl.
*B60N 2/68* (2006.01)
*B60R 7/04* (2006.01)

(52) U.S. Cl.
CPC .............. *B60R 7/043* (2013.01); *B60N 2/686* (2013.01)

(58) Field of Classification Search
CPC .. B60R 7/043; B60N 2/32; B60N 2/34; B60N 2/38; B60N 2/686
USPC ....................... 296/37.15; 297/188.08–188.13
See application file for complete search history.

(56) References Cited

U.S. PATENT DOCUMENTS

| 1,404,484 A | 1/1922 | Schoonmaker | |
| 1,834,817 A * | 12/1931 | Woodfin | B60N 2/502 296/37.15 |
| 5,816,650 A * | 10/1998 | Lucas, Jr. | B60R 7/043 297/188.1 |
| 5,902,009 A | 5/1999 | Singh et al. | |
| 6,877,807 B2 * | 4/2005 | Mizuno | B60R 7/043 297/188.08 |
| 7,121,606 B2 | 10/2006 | Khan et al. | |
| 7,735,896 B2 | 6/2010 | Kubota | |
| 7,770,952 B2 * | 8/2010 | Hanzel | B60N 3/08 296/24.34 |
| 7,794,002 B2 | 9/2010 | Yano et al. | |
| 8,672,387 B1 | 3/2014 | Kaku et al. | |
| 8,960,754 B1 | 2/2015 | Maeda et al. | |
| 9,481,310 B2 * | 11/2016 | Chawlk | B60R 7/043 |
| 2002/0005649 A1 * | 1/2002 | Hofmann | B60R 7/043 296/37.15 |

(Continued)

OTHER PUBLICATIONS

"Outdoor Utility ATV Under Seat Storage Box" http://www.browardmotorsports.com/catalog_product_detail.asp?cat_8399-100597-18957_product_1446981.Yamaha_Under_Seat_Storage_Box.htm.

(Continued)

*Primary Examiner* — Gregory Blankenship
(74) *Attorney, Agent, or Firm* — Keneally Vaidya LLP

(57) ABSTRACT

A storage assembly is usable with a vehicle seat assembly having a seat frame and a seat bottom. The storage assembly includes an upper ring configured for attachment to the seat frame. The upper ring facilitates travel through the opening of the seat frame, and defines a hollow interior with open upper and lower ends. A lower receptacle having an upper opening is configured for attachment to the upper ring, such that the upper opening is contiguous with the hollow interior of the upper ring. The lower receptacle includes an interior storage space that is defined by sides and a bottom, the lower receptacle being larger in size than the upper ring such that the lower receptacle is impeded from travel through the opening of the seat frame. The lower receptacle is configured to be insertable into the open space of the vehicle upon removal of the vehicle body panel.

20 Claims, 5 Drawing Sheets

(56) References Cited

U.S. PATENT DOCUMENTS

| | | | |
|---|---|---|---|
| 2009/0115229 A1* | 5/2009 | Messner | A47C 7/62 |
| | | | 297/188.1 |
| 2013/0038080 A1 | 2/2013 | Tate, Jr. | |
| 2016/0096478 A1* | 4/2016 | Reynolds | B60R 9/02 |
| | | | 280/834 |

OTHER PUBLICATIONS

"Under Seat Storage" http://www.sportsmansguide.com/product/index/kolpin-yamaha-rhino-under-seat-storage?a=572962.

\* cited by examiner

VEHICLE STORAGE CONTAINER, AND METHODS OF USE AND MANUFACTURE THEREOF

BACKGROUND

The disclosed subject matter is directed to a vehicle storage container, and methods of use and manufacture thereof. More particularly, the disclosed subject matter is directed to methods and apparatus for enhancing storage capacities in vehicles, and facilitating insertion and/or assembly of storage containers within vehicles.

Spaces can be provided in an interior compartment of a vehicle for the purpose of storing or otherwise housing various articles, such as money (including change), writing instruments, documents, cleaning supplies, glasses, gum, etc. Some related art storage spaces include compartments that provide the ability to shield or otherwise enclose stored articles, while also allowing vehicular passengers access or limited access to the stored articles. Shielding or otherwise enclosing articles may be beneficial for various reasons, such as to control the location of the stored articles, which would otherwise be subject to movement within the interior of the vehicle based on the vehicle's motion.

SUMMARY

Some types of vehicles, such as all-terrain vehicles (ATVs), provide limited accessories within the vehicle compartment, and thus it may be beneficial to integrate storage areas with various structures in the vehicular passenger compartment that are usable for other purposes. For example, these storage areas can be integrated with one or more of the vehicle seats.

In some of these cases, an open area can be defined by the vehicle body or vehicle frame beneath the vehicle seat, and a bottom of the vehicle seat that supports a vehicle passenger can be moved or removed to expose the open area. A storage container can be disposed within the open area, and this storage container can define an open upper end so that articles stored therein can be accessed by moving or removing the seat bottom. In some of these embodiments, the seat bottom is completely removable from the vehicle body or frame such as by lifting it in an upwardly direction, while in other embodiments a portion of the seat bottom remains attached to the vehicle body or frame and is movable such as via rotation.

In some such structures, the seat bottom is attached to the vehicle body or frame by a seat frame, and this seat frame defines a hole. Thus, once the seat bottom is moved or removed, access to the open end of the storage container is provided via the hole of the seat frame. However, this structure may be subject to the disadvantage that only storage containers that are sufficiently small in size to fit through the hole in the seat frame can be inserted into the open area defined by the vehicle body or frame. In other words, the only storage containers that can be used must be small enough to fit through the hole in the seat frame, which limits the volume of storage space available.

It may therefore be beneficial to provide methods and apparatus that increase the volume of storage space available under the passenger seats, and/or facilitate the insertion or removal of storage containers disposed under the passenger seats. For example, it may be beneficial to provide a storage container that includes an upper ring that is small enough to be insertable through the hole defined in the seat frame and is attachable to the seat frame. A lower receptacle that is larger than the upper ring can be connected to the upper ring. Prior to this connection, the lower receptacle can be inserted laterally into the open space of the vehicle body or frame upon removal of a vehicle body panel. This structure enables the use of a lower receptacle that is relatively large in size and that thereby increases the volume of storage space available beneath the vehicle seat.

Some embodiments are therefore directed to a storage assembly for use with a vehicle seat assembly that includes a seat frame and a seat bottom configured to support a vehicle passenger. The seat frame can define an opening that is contiguous with an open space defined in part by a removable vehicle body panel. The seat bottom can be movable to expose the opening of the seat frame. The storage assembly can include an upper ring that is configured for attachment to the seat frame. The upper ring can be structured to facilitate travel through the opening of the seat frame, and can define a hollow interior with open upper and lower ends. A lower receptacle can have an upper opening and configured for attachment to the upper ring such that the upper opening is contiguous with the hollow interior of the upper ring. The lower receptacle can define an interior storage space that is defined by sides and a bottom, the lower receptacle being larger in size than the upper ring such that the lower receptacle is impeded from travel through the opening of the seat frame. The lower receptacle can be configured to be insertable into the open space of the vehicle upon removal of the vehicle body panel.

Some other embodiments are directed to a seat and storage assembly for use with a vehicle having an open space that is defined in part by a removable vehicle body panel. The vehicle can be configured to transport a vehicle passenger. The seat and storage assembly can include a vehicle seat assembly that includes a seat frame and a seat bottom configured to support the vehicle passenger. The seat frame can define an opening that is contiguous with the open space of the vehicle, and the seat bottom can be movable to expose the opening of the seat frame. The seat and storage assembly can also include a storage assembly that can include an upper ring that is configured for attachment to the seat frame. The upper ring can be structured to facilitate travel through the opening of the seat frame, and can define a hollow interior with open upper and lower ends. A lower receptacle can have an upper opening and configured for attachment to the upper ring such that the upper opening is contiguous with the hollow interior of the upper ring. The lower receptacle can define an interior storage space that is defined by sides and a bottom, the lower receptacle being larger in size than the upper ring such that the lower receptacle is impeded from travel through the opening of the seat frame. The lower receptacle can be configured to be insertable into the open space of the vehicle upon removal of the vehicle body panel.

Still other embodiments are directed to a method of installing a storage assembly within a vehicle, the vehicle including a vehicle seat assembly having a seat frame and a seat bottom configured to support a vehicle passenger, the seat frame defining an opening that is contiguous with an open space defined in part by a removable vehicle body panel, the seat bottom being movable to expose the opening of the seat frame. The method can include: passing an upper ring through the opening of the seat frame; attaching the upper ring to the seat frame, the upper ring defining a hollow interior with open upper and lower ends; inserting a lower receptacle into the open space of the vehicle upon removal of the vehicle body panel by moving the lower receptacle in a direction that is substantially perpendicular to an axis of the upper ring; and attaching the lower receptacle to the upper ring such that an upper opening of the lower receptacle is contiguous with the hollow interior of the upper ring, the lower receptacle defining an interior storage space that is defined by sides and a bottom, the lower receptacle being larger in size than the upper ring such that the lower receptacle is impeded from travel through the opening of the seat frame.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
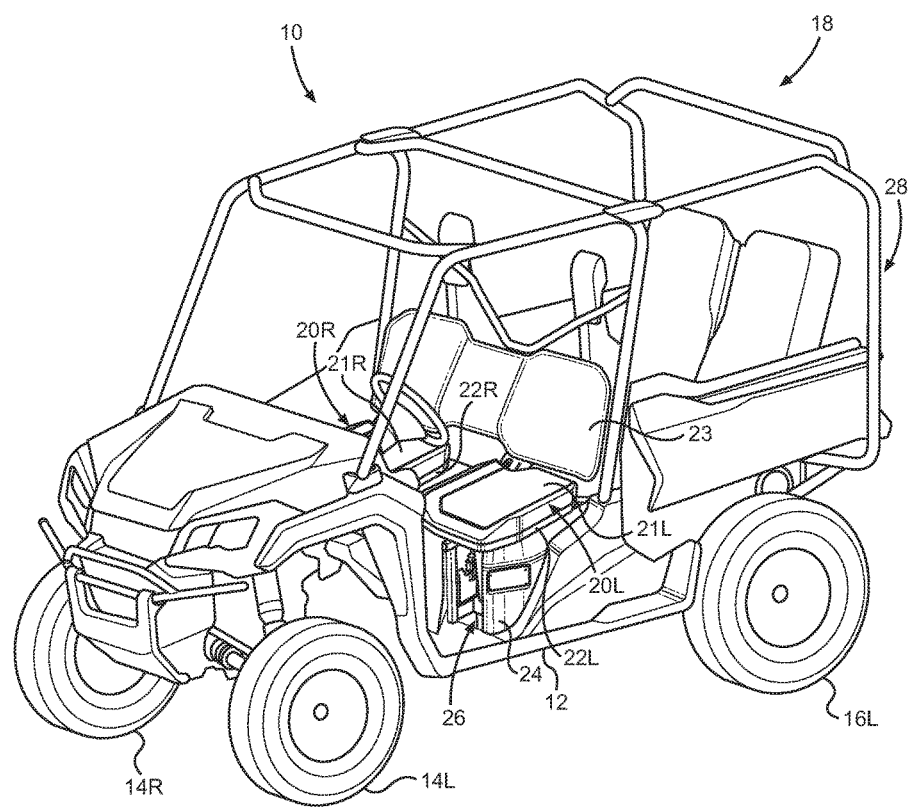
FIG. 1 is a perspective view of an exemplary vehicle including a body having seat assemblies for accommodating a storage assembly in accordance with principles of the disclosed subject matter.

FIG. 1 is a perspective view of an exemplary vehicle 10 including a body 12 having seat assemblies 20L,R for accommodating a storage assembly in accordance with principles of the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed storage assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

The vehicle 10 can include the body 12, a pair of front wheels, 14L, 14R, a pair of rear wheels 16L, 16R (the right-side rear wheel 16R is obstructed from view), and a powertrain. The powertrain is omitted from FIG. 1 for simplicity and clarity of the drawing.

The vehicle 10 can include a pair of seat assemblies 20L, 20R and backrest 23 mounted in a passenger area of the vehicle 10. The seat assemblies 20L, 20R can be disposed on respective seat frames 22L, 22R, the left-side (driver's-side) seat frame 22L shown adjacent a removable side cover 24 which is described below. The side cover 24 can be removed to provide unobstructed access to an under-seat cavity 26 underneath the left-side seat frame 22L to install or remove a storage assembly.

The body 12 can include a roll cage 28 configured to extend around and above the passenger area. The roll cage 28 can cooperate with the body 12 to define openings through which a passenger may pass in order to enter or exit the passenger area.

In some embodiments, the openings through which a passenger may pass may be configured as door assemblies, which occupy the openings. Each door assembly can include a door and window panel assembly, and can be configured to selectively open and close access through the openings by moving between a closed position and a fully opened position. In the closed position, the door assemblies may span the respective openings to obstruct access to the passenger area via the openings. In the closed position, front portions of each door assembly may be latched to the roll cage 28. The fully opened position can be any position where the door assemblies are pivoted away from the respective openings to provide substantially unobstructed access to the passenger area via the openings.

II. Seat Assembly

Figure 2:
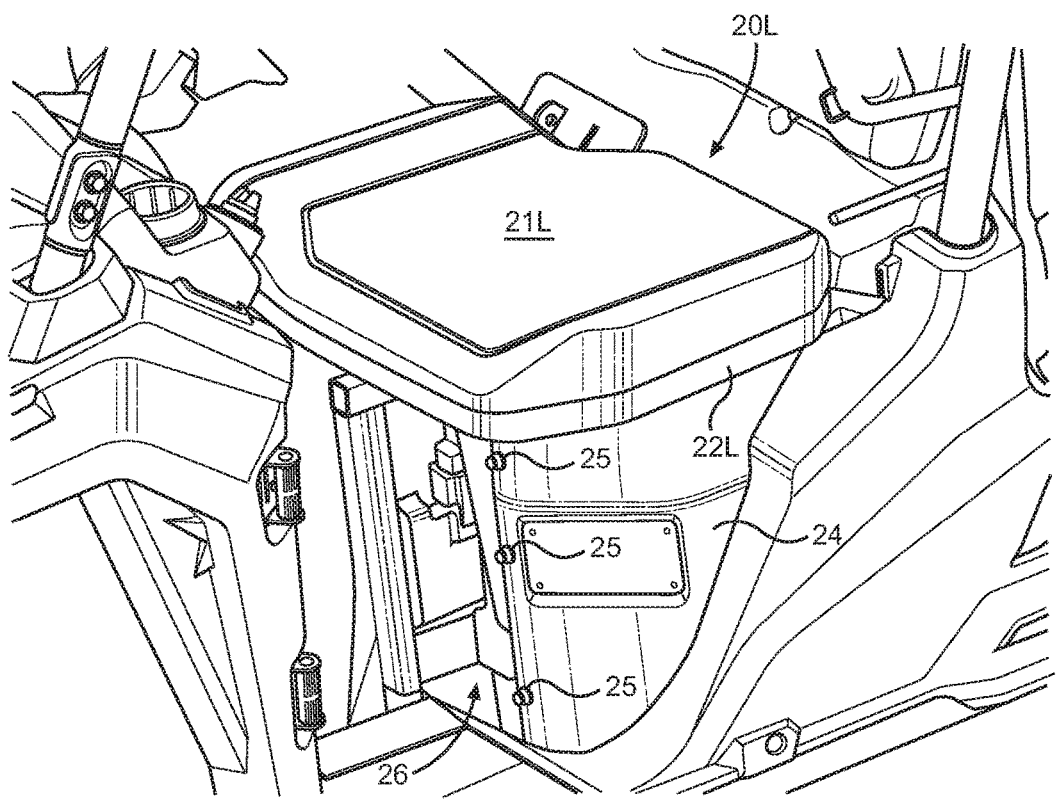
FIG. 2 is a partial perspective view of the body and the seat assembly of FIG. 1.

FIG. 2 is a partial perspective view of the body 12 and the left-side seat assembly 20L of FIG. 1. The seat assembly 20L can be disposed within the passenger area of the body 12. The seat assembly 20L can be configured to support a passenger seated thereon so as to enable the passenger to operate the vehicle 10. As will be discussed in greater detail below, the seat assembly 20L can be configured to open and close to provide and restrict access to a storage assembly located within the under-seat cavity 26.

The seat assembly 20L can include a cushion 21L, a seat frame 22L, an under-seat cavity 26 and a side cover 24. As will be discussed in greater detail below, the seat assembly 20L can accommodate a storage assembly within the under-seat cavity 26, as well as provide access to the storage assembly through the seat frame 22L. A passenger can therefore utilize the storage assembly for storing items proximate the passenger area for advantageous storage space packaging and access to stored items.

The cushion 21L can be disposed on a top side of the seat frame 22L within the passenger area. The cushion 21L can be configured with mounting points for affixing the cushion 21L to the seat frame 22L, the mounting points capable of receiving any appropriate fasteners for securing the cushion 21L to the seat frame 22L. The mounting points and fasteners may include fixtures such as but not limited to bolts, snap, hooks, etc., or may alternatively have adhesive applications. In some embodiments, the cushion 21L may be hingedly attached along an edge of the seat frame 22L so as to form a lid capable of being rotated between opened and closed positions. Specifically, the cushion 21L in some embodiments is hingedly attached to a rearmost edge of the seat frame 22L. The cushion 21L may be formed of plastic, rubber, foam, or any other appropriate material for providing seating support for a passenger.

The seat frame 22L can be connected to the passenger area of the body 12. The seat frame 22L can be configured as a frame surrounding the under-seat cavity 26 and supporting the cushion 21L, as described above. The seat frame 22L can have an upper portion that approximately aligns with edge portions of the cushion 21L, or may be alternatively configured. In some embodiments, the seat frame 22L may be separate and spaced from a seat frame of the right-side (passenger's-side) seat assembly 20R. However, other embodiments may incorporate a single seat frame extending an approximate width of the passenger area so as to support both the seat assemblies 20L, 20R.

The seat frame 22L can be made from any appropriate structural element(s), such as but not limited to tubes, beams, stampings, etc., that can provide sufficient strength and rigidity for supporting a passenger. The seat frame 22L can be formed from a single type of structural element, or alternatively the seat frame 22L can be formed from any combination of these structural elements. The structural elements can have any appropriate cross-sectional shape, such as but not limited to circular, rectangular, regular polygonal, irregular polygonal, hollow, solid, variable along the length of the structural element, etc.

The seat frame 22L can be formed by any appropriate process, such as but not limited to rolling, hydroforming, bending, welding, extruding, stamping, any combination of these processes, etc. Additionally, the seat frame 22L can be formed from any appropriate material, such as but not limited to steel, aluminum, titanium, magnesium, fiber-reinforced plastic, carbon fiber, a composite formed from any combination of these exemplary materials, etc. Portions of the seat frame 22L can be connected to other adjoining portions in any appropriate manner, such as but not limited to mechanical fasteners, welding, adhesive, any combination thereof, etc.

The under-seat cavity 26 can be a space defined by surrounding portions of the seat frame 22L and disposed substantially underneath the cushion 21L. The under-seat cavity 26 can be configured to receive a storage assembly. The under-seat cavity 26 can be further defined by the side cover 24 connected to at least one of the body 12 and the seat frame 22L proximate the opening to the left-side seat assembly 20L of the passenger area, as described below.

The side cover 24 can be configured to extend from the seat frame 22L to a floor of the under-seat cavity 26, the side cover 24 oriented to extend along a side of the seat assembly 20L adjacent the opening to the passenger area. The side cover 25 can overlap with other panels of the body 12, and can include cover fasteners 25 configured to secure the side cover 24 to at least one of the seat frame 22L or the body 12. The side cover 24 can extend along a left-side edge of the seat frame 22L, and may additionally extend along a portion of a front edge of the seat frame 22L.

The side cover 24 can be made from any appropriate structural element(s), such as but not limited to sheets, stampings, etc., that can provide sufficient coverage and rigidity for covering the under-seat cavity 26. The side cover 24 can be formed by any appropriate process, such as but not limited to rolling, hydroforming, bending, welding, plating, stamping, any combination of these processes, etc. Furthermore, the side cover 24 can be formed from any appropriate material, such as but not limited to steel, aluminum, titanium, magnesium, fiber-reinforced plastic, carbon fiber, a composite formed from any combination of these exemplary materials, etc. The seat cover 24 can be connected to the adjoining structural elements such as the seat frame 22L and/or the body 12 in any appropriate manner, such as but not limited to mechanical fasteners, such as the cover fasteners 25, welding, adhesive, any combination thereof, etc. In the present embodiment, the cover fasteners 25 may be configured as bolts.

III. Storage Assembly

Figure 3:
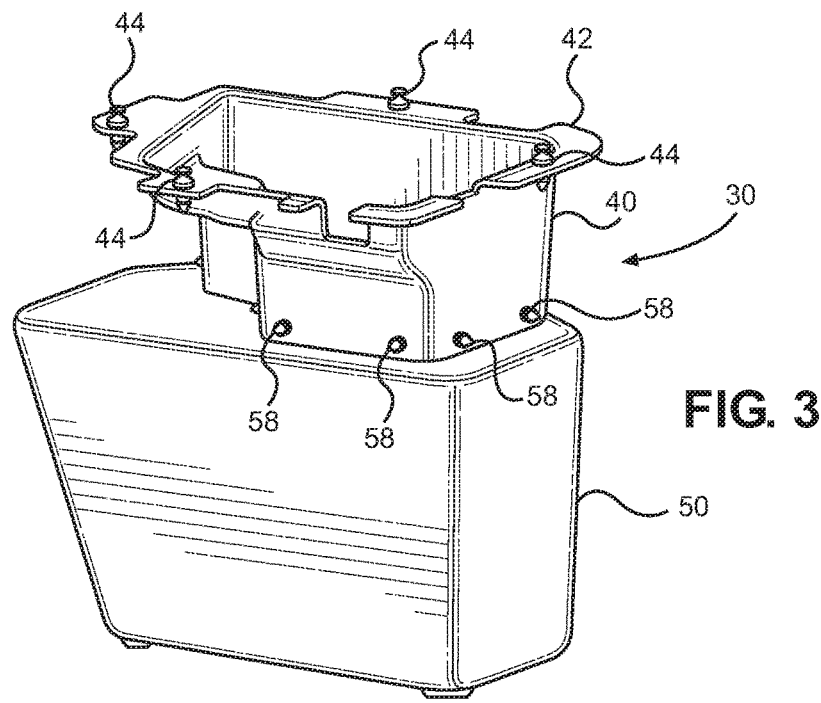
FIG. 3 is a perspective view of an exemplary storage assembly in accordance with principles of the disclosed subject matter.

FIG. 3 is a perspective view of an exemplary storage assembly 30 in accordance with principles of the disclosed subject matter. The storage assembly 30 can be configured for storage of items and can include an upper ring 40 connected to a lower box 50.

The upper ring 40 of the storage assembly 30 can be approximately rectangular in shape, with at least a portion being indented. A top portion of the upper ring 40 can include a ring flange 42 extending around a perimeter of the upper ring 40, such that the ring flange 42 is configured for connecting the upper ring 40 to the seat frame 22L. The ring flange 42 can extend around each edge of the top portion of the upper ring 40, or alternatively may extend from a fewer number of edges. The ring flange 42 may be contoured so as to mate with corresponding portions of the seat frame 22L and/or body 12 which contact the ring flange 42 during installment of the storage assembly 30 within the vehicle 10. The ring flange 42 can additionally include flange fasteners 44 configured to secure the ring flange 42 to at least one of the seat frame 22L or the body 12. However, the ring flange 42 can be connected to adjoining structural elements such as the seat frame 22L and/or the body 12 in any appropriate manner, such as but not limited to mechanical fasteners, such as the flange fasteners 44, welding, adhesive, any combination thereof, etc. In the present embodiment, the flange fasteners 44 may be configured as bolts. The ring flange 42 extends around an opening through the upper ring 40 which is smaller relative to a space defined by an interior of the lower box 50, as will be described below. Therefore, the opening in the upper ring 40 may not unnecessarily constrain storage space in the lower box 50 below.

The lower box 50 of the storage assembly 30 can be approximately rectangular or box-like in shape. In some embodiments, the lower box 50 can be trapezoidal, with a top side of the lower box 50 having a greater surface area than a bottom side. The lower box 50 can have a larger volume than that of the upper ring 40, and a portion of the top side can be connected to a bottom side of the upper ring 40. Furthermore, the top side of the lower box 50 can include an opening configured to mate against a similar opening in the bottom side of the upper ring 40. The respective openings are configured so as to permit passage therethrough of items to be stored and removed from the storage assembly 30.

Both of the upper ring 40 and the lower box 50 of the storage assembly 30 can be formed by any appropriate process, such as but not limited to rolling, hydroforming, bending, welding, extruding, stamping, injection molding, extrusion molding, extrusion blow molding, vacuum forming, etc. Each element of the storage assembly can be formed from any appropriate material, such as but not limited to steel, aluminum, titanium, magnesium, fiber-reinforced plastic, carbon fiber, thermoplastic, rubber, polyvinyl chloride (PVC), a composite formed from any combination of these exemplary materials, etc. The upper ring 40 and the lower box 50 can be connected to each other in any appropriate manner to form the assembled storage assembly 30, such as but not limited to mechanical fasteners, welding, adhesive, any combination thereof, etc. In the present embodiment, the upper ring 40 and the lower box 50 can be secured together by assembly fasteners 52, which may be configured as bolts.

IV. Upper Ring

Figure 4:
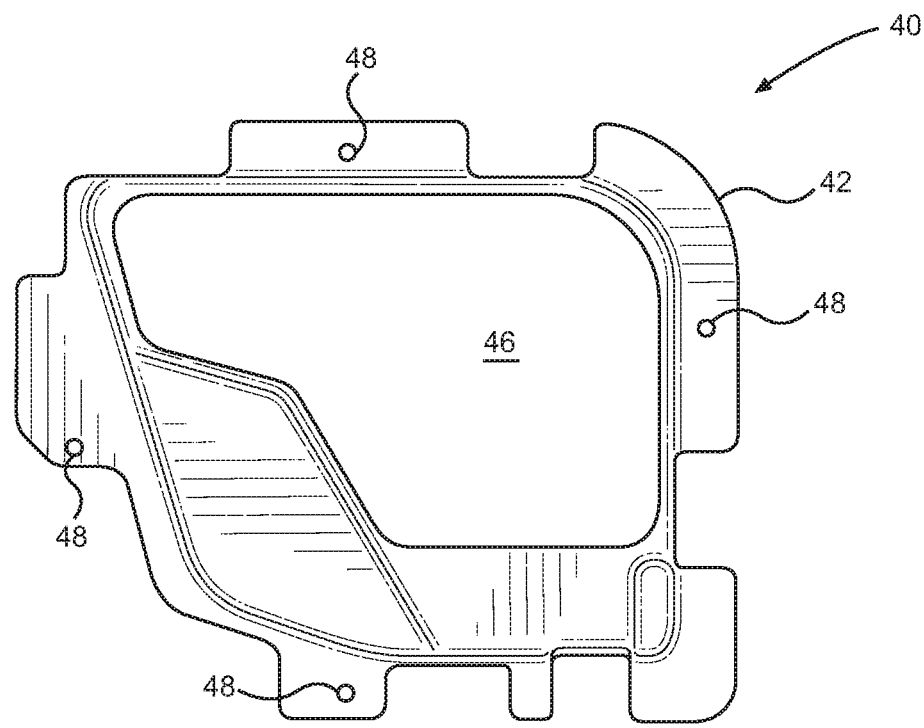
FIG. 4 is a top view of an upper ring of the storage assembly of FIG. 3.

FIG. 4 is a top view of the upper ring 40 of the storage assembly 30 of FIG. 3. As described above, the ring flange 42 can extend around the perimeter of a top portion of the upper ring 40. The ring flange 42 can be a continuous flange extending around the edges of the upper ring 40, or alternatively may be comprised of multiple tabs extending off of the edges. The tabs may follow contours of the perimeter, or may be formed to mate with corresponding structural elements to which the ring flange 42 is connected, such as the seat frame 22L and the body 12. The ring flange 42 can have flange apertures 48 through which the flange fasteners 44 are inserted to connect the upper ring 40 to the adjoining structural element(s) such as the seat frame 22L and/or the body 12. In embodiments featuring the ring flange 42 as separate tabs, the ring flange 42 can be configured to include flange apertures 48 on each tab, or otherwise on some but not all of the tabs.

Figure 5:
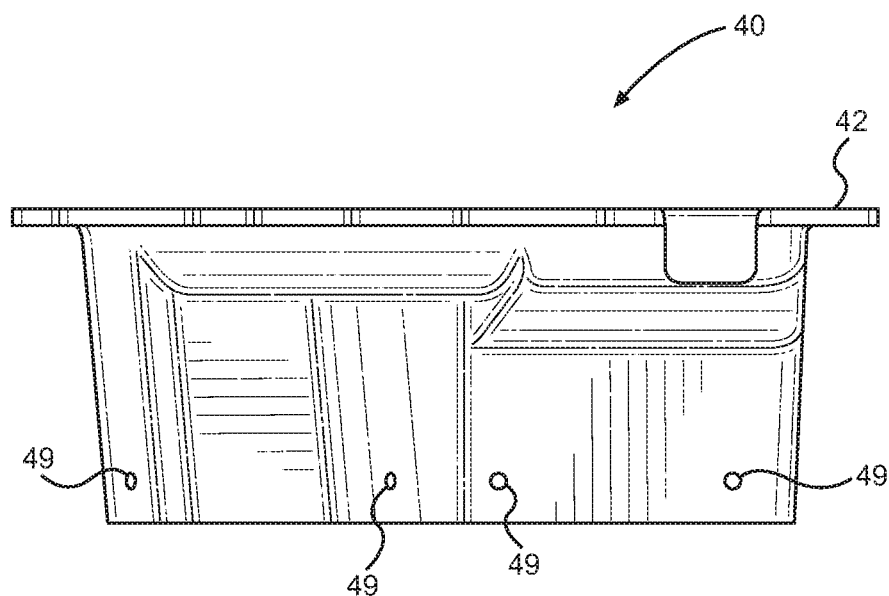
FIG. 5 is a side view of the upper ring of FIG. 3.

The upper ring 40 can be configured to have a ring opening 46 extending through a bottom portion of the upper ring 40. The ring opening 46 can be defined by sides of the upper ring 40 such that the ring opening 46 approximately follows a perimeter of a bottom portion of the upper ring 40. The ring opening 46 can be polygonal, curved, or a combination and is formed to mate with a corresponding box opening 56 when the storage assembly 30 is FIG. 5 is a side view of the upper ring 40 of the storage assembly 30 of FIG. 3. The sides of the upper ring 40 can have base apertures 49 extending through lower portions thereof such that the base apertures 49 are spaced from the ring flange 42. The base apertures 49 are configured for use with fasteners so as to connect the upper ring 40 to the lower box 50 during installation of the storage assembly 30 in the vehicle 10. Each side of the upper ring 40 can have at least one base aperture 49 to overlap complementary apertures in an upper portion of the lower box 50. In some configurations, some sides of the upper ring 40 may not include any apertures. Furthermore, some embodiments may not include apertures at all, instead having other attachment mechanisms such as clips or snaps.

V. Lower Box

Figure 6:
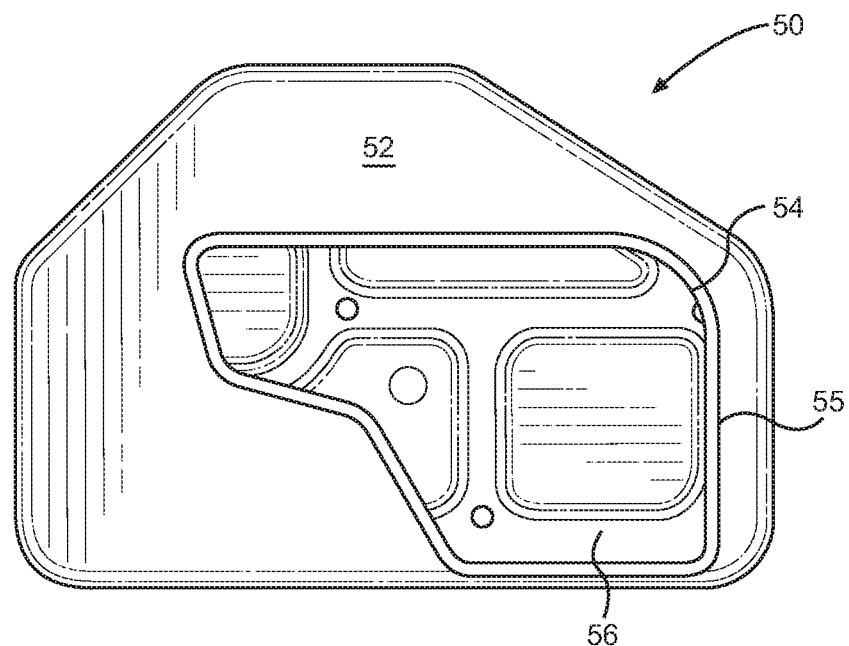
FIG. 6 is a top view of a lower box of the storage assembly of FIG. 3.

FIG. 6 is a top view of the lower box 50 of the storage assembly 30 of FIG. 3. As described above, the lower box 50 is approximately box-shaped having an interior space defined by exterior walls. The lower box 50 can have a top wall 52 having a box opening 54 therein, such that a bottom wall 56 is visible through the box opening 54 when viewed from above. The box opening 54 can be complementary to the ring opening 46 in the upper ring 40. Therefore, upon connecting the upper ring 40 to the lower box 50, the ring opening 46 and the box opening 54 are aligned to permit items to be passed therethrough for storing within the storage assembly 30. The box opening 54 can have a lip 55 formed thereon, as well as box apertures 58 configured to extend through the lip 55, as will be described below.

Figure 7:
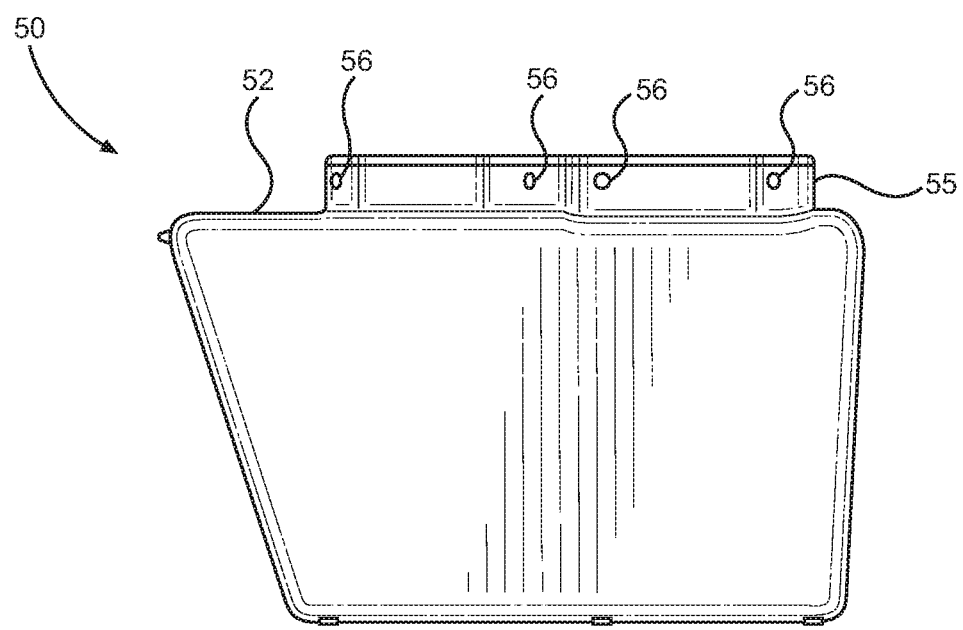
FIG. 7 is a side view of the lower box of FIG. 3.

FIG. 7 is a side view of the lower box 50 of FIG. 3. The present embodiment of the lower box 50 can include the lip 55 having box apertures 58 formed therein. The box apertures 58 can be configured to overlap with the corresponding base apertures 49 in the upper ring 40, assembly fasteners being inserted thereafter to connect the upper ring 40 and the lower box 50.

VI. Storage Assembly Installation

Figure 8:
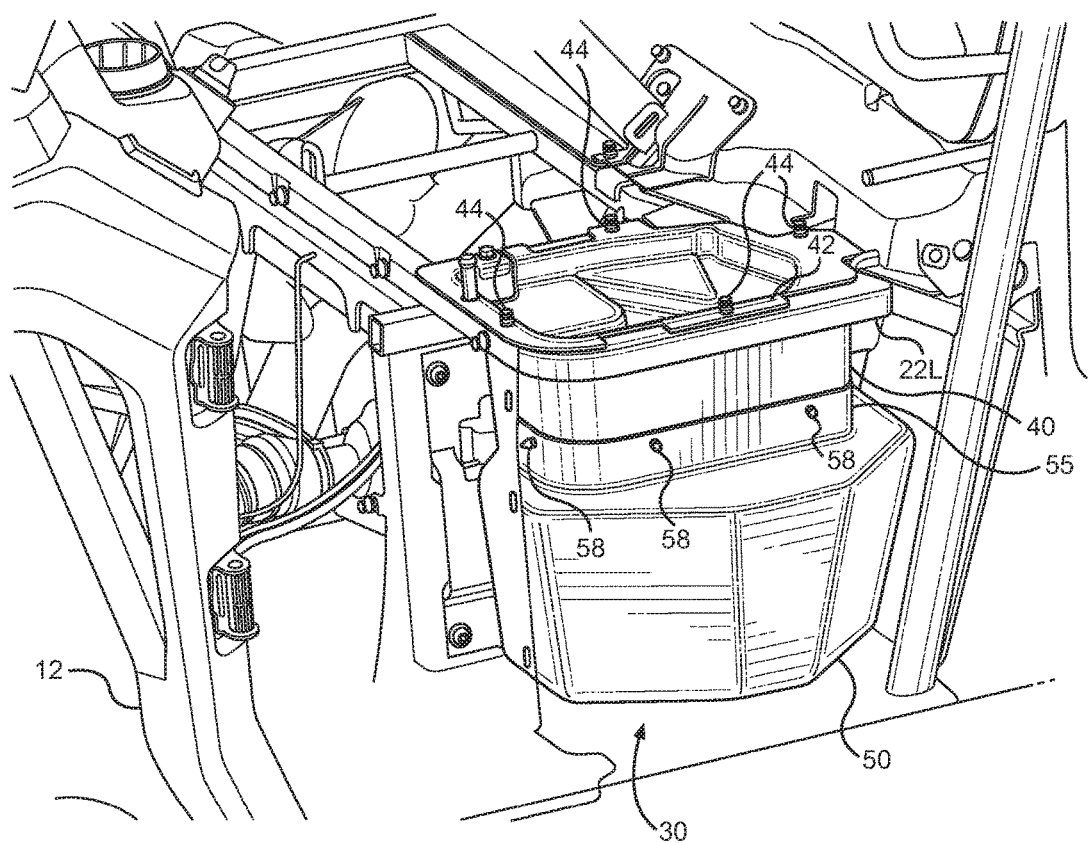
FIG. 8 is a partial perspective view of the seat assembly of FIG. 2 shown with a side cover removed.

FIG. 8 is a partial perspective view of the seat assembly 10 of FIG. 2 shown with the side cover 24 removed, with the storage assembly 30 shown installed in the vehicle 10.

In the present embodiment, the lower box 50 can be inserted into the under-seat cavity 26 once the side cover 24 has been removed. Specifically, the lower box 50 can be inserted laterally from a side of the body 12 adjacent the opening to the right side of the passenger area. The lower box 50 can be configured so as to have a complementary shape for insertion within the under-seat cavity 26. Once inserted, the lower box 50 can be disposed so as to extend beyond the seat frame 22L through which the upper ring 40 is inserted, as will be described below.

Before the upper ring 40 can be connected to the lower box 50, the cushion 21L must be lifted away from the seat frame 22L. The cushion 21L can be hinged open away from the seat frame 22L, for example hinged along the back of the seat frame 22L. However, the cushion 21L can also be removed entirely from the seat frame 22L by either unfastening the cushion 21L or simply lifting the cushion off of the seat frame 22L. Alternatively, the cushion 21L can be slid away from the seat frame 22L to reveal the under-seat cavity 26.

With the cushion 21L lifted away from the seat frame 22L, the upper ring 40 can be dropped into the under-seat cavity 26 from above the seat frame 22L. The upper ring 40 can be configured so that the ring flange 42 catches on the seat frame 22L at attachment portions when the upper ring 40 is fully inserted into the under-seat cavity 26. The flange apertures 48 of the ring flange 42 overlap corresponding apertures on an upper surface of the seat frame 22L that contacts the ring flange 42. Flange fasteners 44 can thereby in inserted through aligned apertures in the ring flange 42 and the seat frame 22L to connect the upper ring 40 to the seat frame 22L. Specifically, push pins can be used to connect the above-described structures. However, the ring flange 42 can be connected to the seat frame 22L in any appropriate manner to secure the upper ring 40 to the seat assembly 20L, such as but not limited to mechanical fasteners, welding, adhesive, any combination thereof, etc. When fully inserted, a lower portion of the upper ring 40 contacts and overlaps with an upper portion of the lower box 50 so as to form a connection, as will be described below.

While inserting the upper ring 40 through the seat frame 22L and into the under-seat cavity 26, the bottom portion of the upper ring 40 is overlapped with the upper portion of the lower box 50 that is disposed within the under-seat cavity 26. Specifically, the lower portion of the upper ring 40 overlaps the lip 55 of the lower box 50 such that the upper ring 40 extends into or outside of the lip 55. Base apertures 49 of the upper ring 40 are thereby aligned with the box apertures 56 in the lip 55 of the lower box 50. Once aligned, assembly fasteners 58 can be inserted therethrough to connect the upper ring 40 to the lower box 50. Presently, push pins can be used to connect the above-described structures. However, the upper ring 40 and the lower box 50 can be connected to each other in any appropriate manner, such as but not limited to mechanical fasteners, welding, adhesive, any combination thereof, etc. With fasteners connecting the lower box 50 and the upper ring 40, as well as connecting the upper ring 40 to the seat assembly 20L, the storage assembly 30 is effectively secured to the body 12 within the under-seat cavity 26. The fastening of the above-described structures to one another can occur in any order and is not limited to the order in which it is described above. For instance, the upper ring 40 and the lower box 50 can be connected via fasteners prior to the upper ring 40 being fastened to the seat frame 22L, etc.

Once the storage assembly 30 has been assembled within the under-seat cavity 26 and is attached to the seat frame 22L, the cushion 21L can be placed or hinged back onto the seat frame 22L so as to form the seat assembly 20L with the backrest 23. The cushion 21L may be disposed on the ring flange 42 of the upper ring 40, or may alternatively rest on the flange fasteners 44. Further, the cushion 21L may contact the seat frame 22L in embodiments featuring tabs included in the ring flange 42, with spaces exposing the seat frame 22L being present between tabs. The cushion 21L can be attached to the seat assembly 20L or be disposed within the seat assembly 20L without being attached. Moving the cushion 21L onto and away from the top opening of the under-seat cavity 26 through the seat frame 22L permits access to the interior of the storage assembly 30. Items can thereby be placed into and removed from the storage assembly 30 by moving the cushion 21L.

The side cover 24 can also be attached to the body 12 and/or the seat frame 22L of the vehicle by inserting fasteners through corresponding apertures such that the side cover 24 covers the under-seat cavity 26 and adjacent portions of the storage assembly 30. With the side cover 24 secured to cover the under-seat cavity 26, the storage assembly 30 is fully installed.

VII. Alternative Embodiments

While certain embodiments of the invention are described above, and FIGS. 1-8 disclose the best mode for practicing the various inventive aspects, it should be understood that the invention can be embodied and configured in many different ways without departing from the spirit and scope of the invention.

For example, embodiments are disclosed above in the context of the storage assembly 30 configured for installation underneath the driver-side seat assembly 20L as shown in FIGS. 1-8. However, embodiments are intended to include or otherwise cover storage assemblies installed within any seat assemblies and seat frames of the vehicle disclosed above, such as underneath a passenger-side seat assembly or underneath rear seat assemblies.

For example, exemplary embodiments are intended to include the upper ring 40 inserted through the top of the seat frame 22L and connected to the lower box 50. This configuration can have the upper ring 40 fastened to the seat frame 22L, and the lower box 50 then fastened to the upper ring 40. In another alternative embodiment, the lower box 50 can be fastened to the seat frame 22L and/or the body 12, while the upper ring 40 is then secured in place by virtue of its connection to the lower box 50.

In fact, in some embodiments, the upper ring 40 and the lower box 50 may both be fastened to structural elements of the vehicle 10 such that they are not necessarily connected to one another, yet they still may be for added support.

All or some of the alternative structures disclosed above with regard to the upper ring 40 may also apply to the lower box 50. The above alternative structures of the upper ring 40 and the lower box 50 are merely provided for exemplary purposes, and as indicated above, embodiments are intended to cover any type of storage assembly that is integrated within an exemplary vehicle, particularly a seat assembly, or otherwise configured as disclosed above.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A storage assembly for use with a vehicle seat assembly that includes a seat frame and a seat bottom configured to support a vehicle passenger, the seat frame defining an opening that is contiguous with an open space defined in part by a removable vehicle body panel, the seat bottom being movable to expose the opening of the seat frame, the storage assembly comprising:
   an upper ring that is configured for attachment to the seat frame, the upper ring being structured to facilitate travel through the opening of the seat frame, the upper ring defining a hollow interior with open upper and lower ends; and
   a lower receptacle having an upper opening and configured for attachment to the upper ring such that the upper opening engages the lower end of the upper ring and is contiguous with the hollow interior thereof, the lower receptacle defining an interior storage space that is defined by sides and a bottom, the lower receptacle being larger in size than the upper ring such that the lower receptacle is impeded from travel through the opening of the seat frame, the lower receptacle being configured to be insertable into the open space of the vehicle upon removal of the vehicle body panel.

2. The storage assembly according to claim 1, wherein the lower receptacle defines an upper lip that overlaps a portion of a side of the upper ring, the upper lip being connectable to a lower portion of the upper ring.

3. The storage assembly according to claim 2, wherein upper lip of the lower receptacle extends within the hollow interior of the upper ring.

4. The storage assembly according to claim 3, wherein the upper lip of the lower receptacle defines holes and sides of the upper ring define holes that are alignable with the holes of the upper lip, the storage assembly further including fasteners that are insertable into the aligned holes to connect together the upper ring and the lower receptacle.

5. The storage assembly according to claim 4, wherein the upper ring defines a flange that extends around an upper perimeter of the upper ring, the flange being connectable to the seat frame.

6. The storage assembly according to claim 5, wherein the flange of the upper ring defines apertures and the seat frame defines apertures that are alignable with the apertures of the flange, the storage assembly further including pins that are insertable through the aligned apertures to secure the upper ring to the seat frame.

7. The storage assembly according to claim 1, wherein a perimeter of the lower receptacle is larger than a perimeter of the upper ring, such that a portion of the lower receptacle extends laterally beyond an exterior surface of the upper ring as viewed from above.

8. The storage assembly according to claim 1, wherein a perimeter of the seat frame is larger than a perimeter of the upper ring, such that a portion of the seat frame extends laterally beyond an exterior surface of the upper ring as viewed from above.

9. The storage assembly according to claim 1, wherein the upper ring is configured to be completely covered by the seat bottom when the seat bottom is disposed in an orientation to support the vehicle passenger.

10. The storage assembly according to claim 1, wherein the hollow opening of the lower receptacle is accessible via the hollow interior of the upper ring and the opening of the seat frame.

11. A seat and storage assembly for use with a vehicle having an open space that is defined in part by a removable vehicle body panel, the vehicle being configured to transport a vehicle passenger, the seat and storage assembly comprising:
   a vehicle seat assembly that includes a seat frame and a seat bottom configured to support the vehicle passenger, the seat frame defining an opening that is contiguous with the open space of the vehicle, the seat bottom being movable to expose the opening of the seat frame; and
   a storage assembly that includes:
      an upper ring that is configured for attachment to the seat frame, the upper ring being structured to facilitate travel through the opening of the seat frame, the upper ring defining a hollow interior with open upper and lower ends; and
      a lower receptacle having an upper opening and configured for attachment to the upper ring such that the upper opening is contiguous with the hollow interior of the upper ring, the lower receptacle defining an interior storage space that is defined by sides and a bottom, the lower receptacle being larger in size than the upper ring such that the lower receptacle is impeded from travel through the opening of the seat frame, the lower receptacle being configured to be insertable into the open space of the vehicle upon removal of the vehicle body panel.

12. The seat and storage assembly according to claim 11, wherein the lower receptacle defines an upper lip that overlaps a portion of a side of the upper ring, the upper lip being connectable to a lower portion of the upper ring.

13. The seat and storage assembly according to claim 12, wherein upper lip of the lower receptacle extends within the hollow interior of the upper ring.

14. The seat and storage assembly according to claim 13, wherein the upper lip of the lower receptacle defines holes and sides of the upper ring define holes that are alignable with the holes of the upper lip, the storage assembly further including fasteners that are insertable into the aligned holes to connect together the upper ring and the storage receptacle.

15. The seat and storage assembly according to claim 14, wherein the upper ring defines a flange that extends around an upper perimeter of the upper ring, the flange being connectable to the seat frame.

16. The seat and storage assembly according to claim 15, wherein the flange of the upper ring defines apertures and the seat frame defines apertures that are alignable with the apertures of the flange, the storage assembly further including pins that are insertable through the aligned apertures to secure the upper ring to the seat frame.

17. The seat and storage assembly according to claim 11, wherein a perimeter of the lower receptacle is larger than a perimeter of the upper ring, such that a portion of the lower receptacle extends laterally beyond an exterior surface of the upper ring as viewed from above.

18. The seat and storage assembly according to claim 11, wherein a perimeter of the seat frame is larger than a perimeter of the upper ring, such that a portion of the seat frame extends laterally beyond an exterior surface of the upper ring as viewed from above.

19. The seat and storage assembly according to claim 11, wherein the upper ring is configured to be completely covered by the seat bottom when the seat bottom is disposed in an orientation to support the vehicle passenger; and the hollow opening of the lower receptacle is accessible via the hollow interior of the upper ring and the opening of the seat frame.

20. A method of installing a storage assembly within a vehicle, the vehicle including a vehicle seat assembly having a seat frame and a seat bottom configured to support a vehicle passenger, the seat frame defining an opening that is contiguous with an open space defined in part by a removable vehicle body panel, the seat bottom being movable to expose the opening of the seat frame, the method comprising:
   passing an upper ring through the opening of the seat frame;
   attaching the upper ring to the seat frame, the upper ring defining a hollow interior with open upper and lower ends;
   inserting a lower receptacle into the open space of the vehicle upon removal of the vehicle body panel by moving the lower receptacle in a direction that is substantially perpendicular to an axis of the upper ring; and
   attaching the lower receptacle to the upper ring such that an upper opening of the lower receptacle is contiguous with the hollow interior of the upper ring, the lower receptacle defining an interior storage space that is defined by sides and a bottom, the lower receptacle being larger in size than the upper ring such that the lower receptacle is impeded from travel through the opening of the seat frame.

* * * * *